United States Patent
Hung

(10) Patent No.: US 8,120,589 B2
(45) Date of Patent: Feb. 21, 2012

(54) TOUCH PANEL

(75) Inventor: Hung-Yi Hung, Guangdong (CN)

(73) Assignee: Century Display(ShenZhen)Co., Ltd., Baoan, Shen-zhen, Guangdong (CN)

( * ) Notice: Subject to any disclaimer, the term of this patent is extended or adjusted under 35 U.S.C. 154(b) by 0 days.

(21) Appl. No.: 12/869,778

(22) Filed: Aug. 27, 2010

(65) Prior Publication Data

US 2011/0063237 A1 Mar. 17, 2011

Related U.S. Application Data

(63) Continuation of application No. PCT/CN2009/075017, filed on Nov. 18, 2009.

(30) Foreign Application Priority Data

Sep. 11, 2009 (CN) .......................... 2009 1 0190017

(51) Int. Cl.
*G06F 3/041* (2006.01)
(52) U.S. Cl. ...................... 345/173; 345/174; 178/18.01
(58) Field of Classification Search .......... 345/173–179; 178/18.01–18.06

See application file for complete search history.

(56) References Cited

U.S. PATENT DOCUMENTS

| | | | | |
|---|---|---|---|---|
| 5,847,690 A | * | 12/1998 | Boie et al. | 345/104 |
| 7,903,096 B2 | * | 3/2011 | Jeon et al. | 345/174 |
| 2008/0055268 A1 | * | 3/2008 | Yoo et al. | 345/173 |
| 2009/0085891 A1 | | 4/2009 | Yang et al. | |
| 2010/0090979 A1 | * | 4/2010 | Bae | 345/174 |

FOREIGN PATENT DOCUMENTS

CN 101349960 A 1/2009

* cited by examiner

*Primary Examiner* — Kimnhung Nguyen
(74) *Attorney, Agent, or Firm* — Winston Hsu; Scott Margo

(57) ABSTRACT

A touch panel disposed on a display panel includes a substrate, a plurality of first sensing strings and second sensing strings, and a plurality of assistant lines. The first sensing strings and the second sensing strings include sensing pads, a plurality of first connecting lines and a plurality of second connecting lines. The first connecting lines are parallel to a first direction and electrically connected to portions of the sensing pads in series to construct the first sensing strings. The second connecting lines are parallel to a second direction and electrically connected to the other portions of the sensing pads in series to construct the second sensing strings. The first and the second sensing pads are coplanar. The first connecting lines are electrically insulated from the second connecting lines. The assistant lines are positioned within an area of the sensing pads. The assistant lines directly contact with the sensing pads.

13 Claims, 18 Drawing Sheets

TOUCH PANEL

CROSS REFERENCE TO RELATED APPLICATIONS

This application is a continuation of PCT/CN2009/075017, filed on Nov. 18, 2009. The contents of PCT/CN2009/075017 are all hereby incorporated by reference.

BACKGROUND OF THE INVENTION

1. Field of the Invention

The present invention relates generally to a touch panel, and more particularly, to a touch panel having low resistance and superior transmittance.

2. Description of the Prior Art

Conventional touch panels include resistive, capacitive, infrared (IR) and acoustic touch panels, among others. The resistive and capacitive touch panels are widely used while the capacitive touch panels draw more and more attention because of advantages of humanized operational mode provided by its characteristic of multi-touch.

FIG. 1A is a top plan view of a portion of a conventional touch panel. FIG. 1B is a cross-sectional view taken along abbreviated line A-A' of FIG. 1. Please refer to both FIG. 1A and FIG. 1B. The touch panel 100 is exemplarily a capacitive touch panel and includes a substrate 110, a plurality of first sensing strings 120 and a plurality of second sensing strings 130. The first sensing strings 120 are disposed on the substrate 110 and parallel to each other. Each of the first sensing string 120 includes a plurality of first sensing pads 122 and a plurality of first connecting lines. The first connecting lines 124 are parallel to a first direction D1 and electrically connected to the first sensing pads 122 in series. The second sensing strings 130 are disposed on the substrate 110 and parallel to each other. Each of the second sensing string 130 includes a plurality of second sensing pads 132 and a plurality of second connecting lines 134. The second connecting lines 134 are parallel to a second direction D2 and electrically connected to the second sensing pads 132 in series. Dielectric patterns 126 are formed between the first connecting lines 124 and the second connecting lines 134 for electrically isolating the first connecting lines 124 from the second connecting lines 134.

For example, a signal is sequentially transmitted to each of the first and second sensing strings 120, 130. When the touch panel 100 is touched by a user's finger, a capacitance is generated at the touched point by the first sensing pad 122, the second sensing pad 132 and the finger. Thus signal changes are caused in the first sensing string 120 and the second sensing string 130. Accordingly, the touch point is recognized by detecting the signal changes in the first sensing string 120 and the second sensing string 130.

When the size of the touch panel 100 is increased, the length of the sensing strings of the touch panel 100 is consequently increased. Therefore, a line resistance of the first sensing strings 120 along with the first direction D1, or a line resistance of the second sensing strings 130 along with the second direction D2 is increased. Consequently the sensitivity of the touch panel 100 is deteriorated. In particularly, the first sensing pads 122 and the second sensing pads 132 include transparent conductive material such as indium tin oxide (ITO).

Please refer to FIG. 1C, which is an illustration of a correlation diagram of a thickness of the ITO corresponding to the sheet resistance and transmittance. The thickness of the ITO is substantially inversely proportional to the resistance. Therefore, the prior art has developed a method to increase the thickness of first sensing pads 122 and the second sensing pads 132 of the touch panel 100 in order to reduce the resistance. However, when increasing the thickness of the first sensing pads 122 and the second sensing pads 132, the transmittance of the touch panel 100 is deteriorated as shown in FIG. 1C.

Accordingly, China Patent Application Number 200710138674 and US Patent Application Publication Number US20090085891 respectively provide a method for reducing the resistance of the touch panel. However, it is found that a layout provided by China Patent Application Number 200710138674 is limited by the transmittance of the touch panel and its provided manufacturing process is relatively complicated. US Patent Application Publication Number US20090085891 reduction in resistance is of little value, but the downsides of such design applies the use of both sides driving method and which, as consequence, causes adding more electrode strings plus enlarging the peripheral region.

There is therefore a continuous need to develop the touch panel 100 having improved sensitivity and high transmittance.

SUMMARY OF THE INVENTION

The present invention provides a touch panel having low resistance and superior transmittance.

The present invention provides a touch panel disposed on a display panel. The touch panel comprises a substrate, a plurality of first sensing strings, a plurality of second sensing strings and a plurality of assistant lines. The first sensing strings are disposed on the substrate and parallel to each other, and the second sensing strings are disposed on the substrate and parallel to each other. The first sensing strings comprise a plurality of first sensing pads and a plurality of first connecting lines. The second sensing strings comprise a plurality of second sensing pads and a plurality of second connecting lines. The first connecting lines are parallel to a first direction and electrically connected to portions of the sensing pads in series to construct the first sensing strings. The second connecting lines are parallel to a second direction and electrically connected to the other portions of the sensing pads in series to construct the second sensing strings. The first sensing pads and the second sensing pads are coplanar. The first connecting lines are electrically isolated from the second connecting lines. The assistant lines are positioned within an area of the sensing pads and directly contact the sensing pads.

In an embodiment of the present invention, a line width of each one of the assistant lines of the provided touch panel is smaller than 30 μm. The first connecting lines and the assistant lines are formed by same layer, and the second connecting lines and the sensing pads are formed by same layer. Portions of the assistant lines are connected to the two adjacent first connecting lines.

In an embodiment of the present invention, the assistant lines of the provided touch panel are alternatively positioned in the first sensing strings or in the second sensing strings.

In an embodiment of the present invention, the assistant lines of the provided touch panel are positioned in both of the first sensing strings and the second sensing strings.

In an embodiment of the present invention, the provided touch panel further comprises a dielectric layer positioned in between the first connecting lines and the second connecting lines for electrically isolating the first connecting lines from the second connecting lines. The touch panel further comprises a protecting layer positioned on the substrate and covering the first sensing strings and the second sensing strings.

In an embodiment of the present invention, the sensing pads of the provided touch panel comprise a transparent conductive material, and the transparent conductive material comprises ITO or IZO. The assistant lines comprise metal such as aluminum (Al), molybdenum (Mo), Al/Mo multilayer, Al/neodymium (Nd) and Mo multilayer, or the combination thereof.

In an embodiment of the present invention, the display panel comprises a black matrix pattern, and the black matrix pattern includes a plurality of horizontal lines parallel to the first direction and a plurality of vertical lines parallel to the second direction for defining a plurality of pixel regions. The assistant lines are overlapped to the black matrix pattern.

As mentioned above, the resistance of the assistant lines positioned on the touch panel is smaller than that of the sensing pads; therefore the whole resistance of the touch panel provided by the present invention is reduced. In some embodiments, the assistant lines are positioned corresponding to the black matrix pattern of the display panel, therefore an aperture ratio of the display panel is impervious to the touch panel provided by the present invention, and the resistance of the touch panel is reduced while the transmittance of the touch panel remains superior.

These and other objectives of the present invention will no doubt become obvious to those of ordinary skill in the art after reading the following detailed description of the preferred embodiment that is illustrated in the various figures and drawings.

DETAILED DESCRIPTION

First Embodiment

Figure 1A:
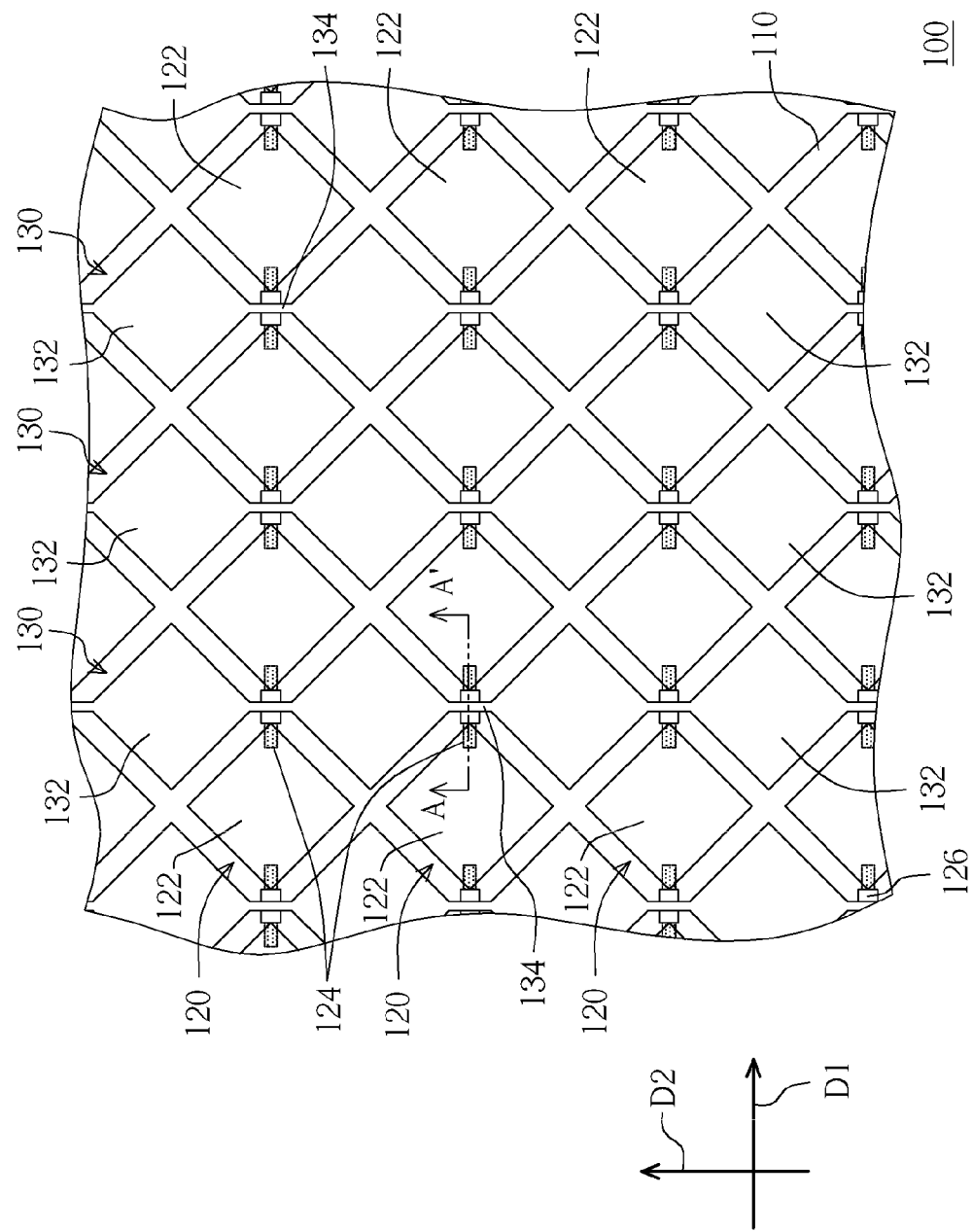
FIG. 1A is a top plan view of a portion of a conventional touch panel.
Figure 1B:
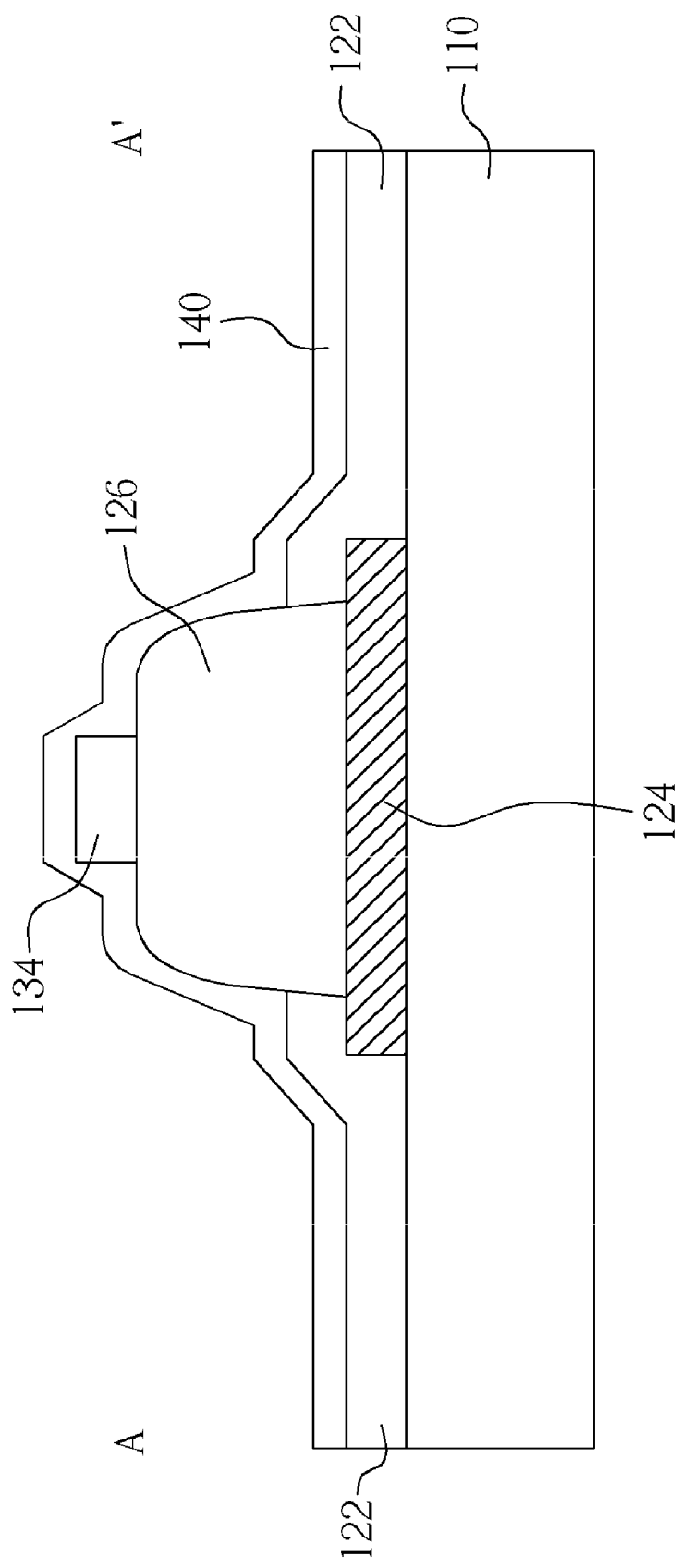
FIG. 1B is a cross-sectional view taken along abbreviated line A-A' of FIG. 1.
Figure 1C:
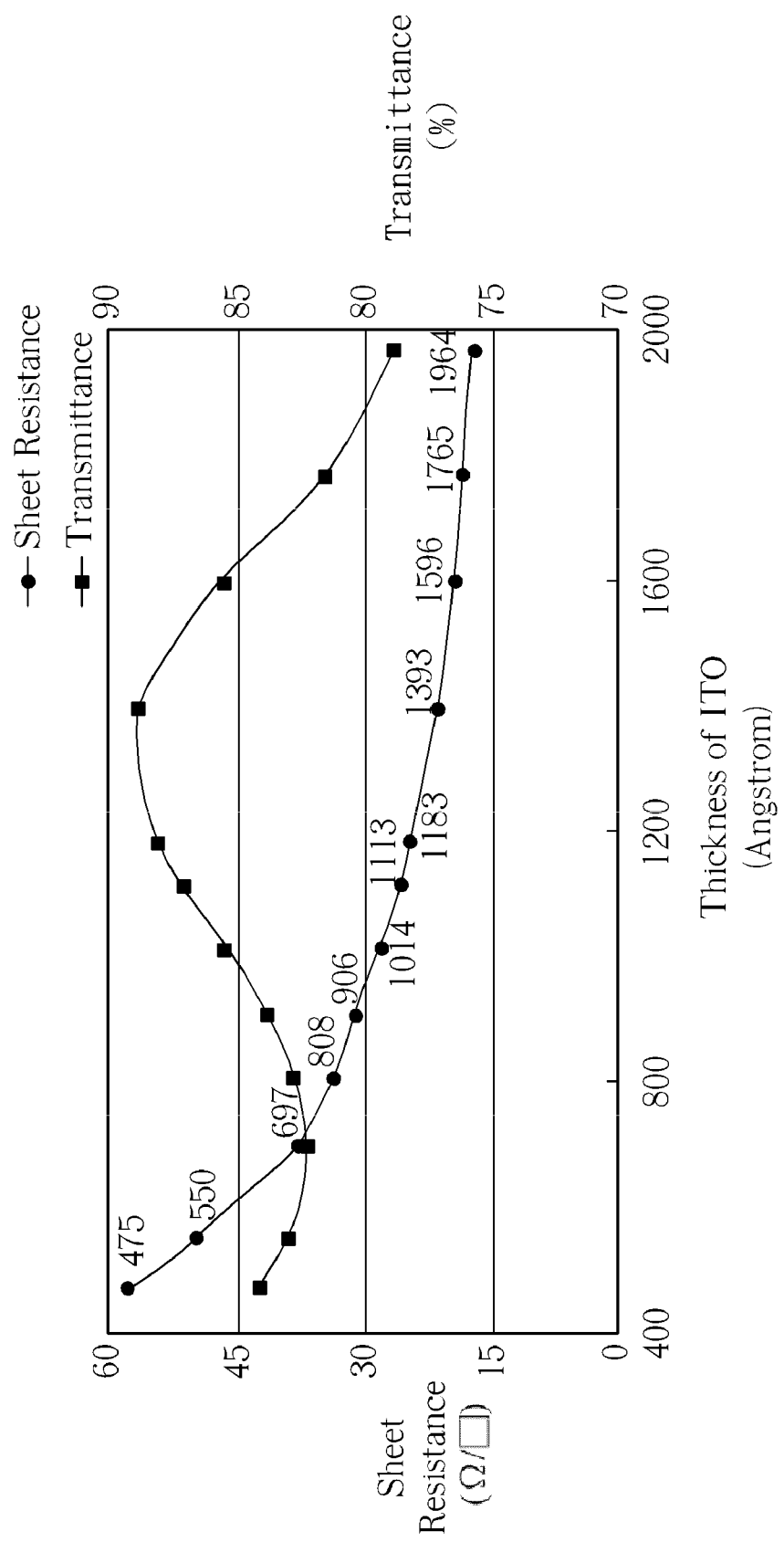
FIG. 1C is an illustration of a correlation diagram of a thickness of the ITO corresponding to the sheet resistance and transmittance.
Figure 2:
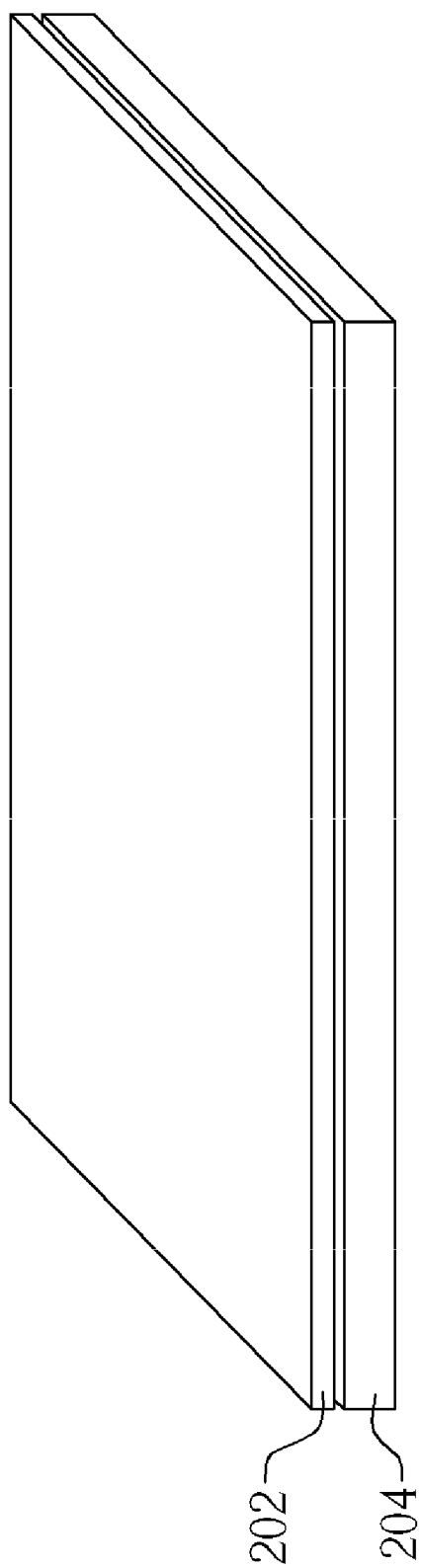
FIG. 2 is a schematic drawing of a touch panel and a display panel provided by a first embodiment of the present invention.
Figure 3:
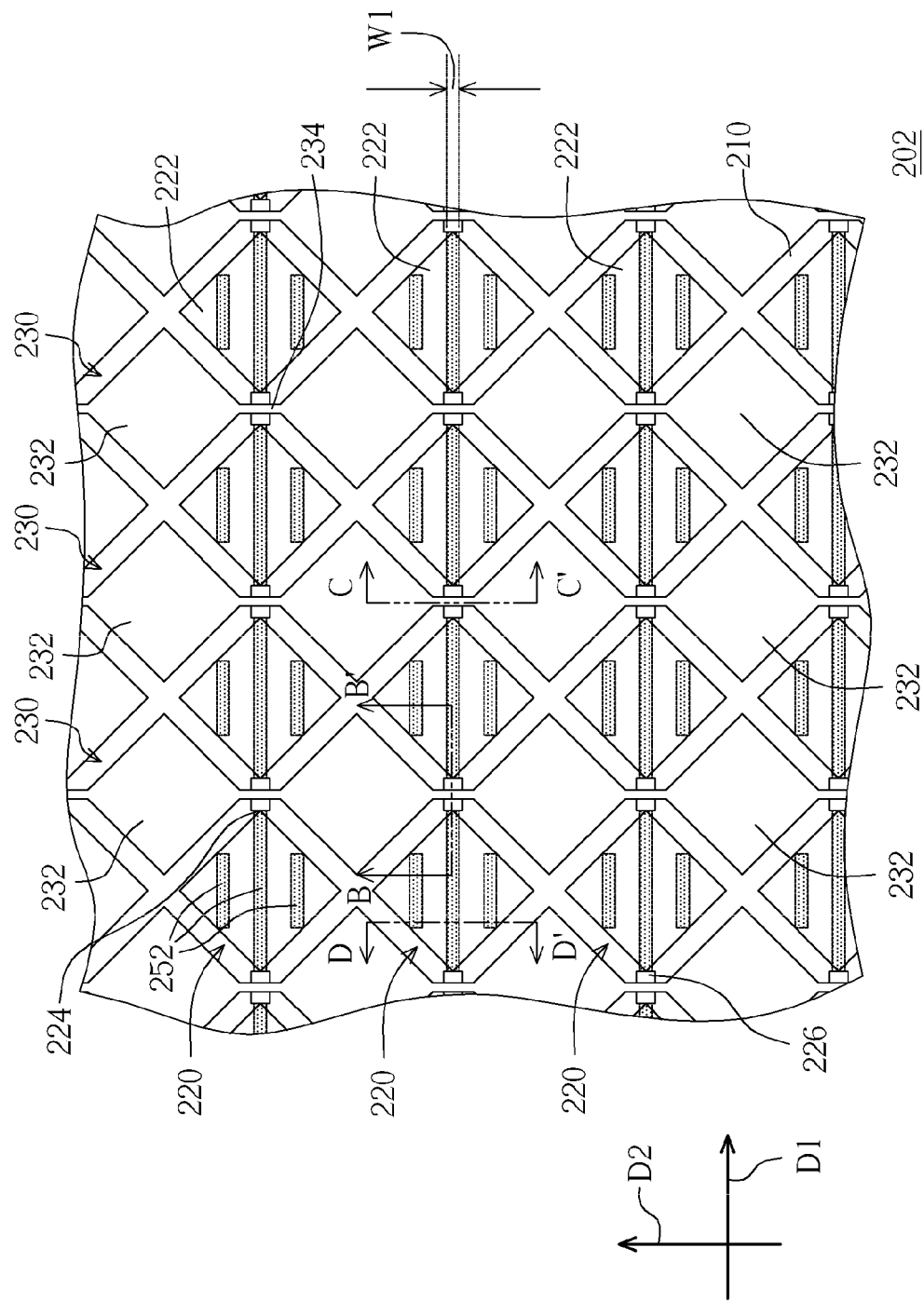
FIG. 3 is a top plan view of a portion of the touch panel of FIG. 2.
Figure 4A:
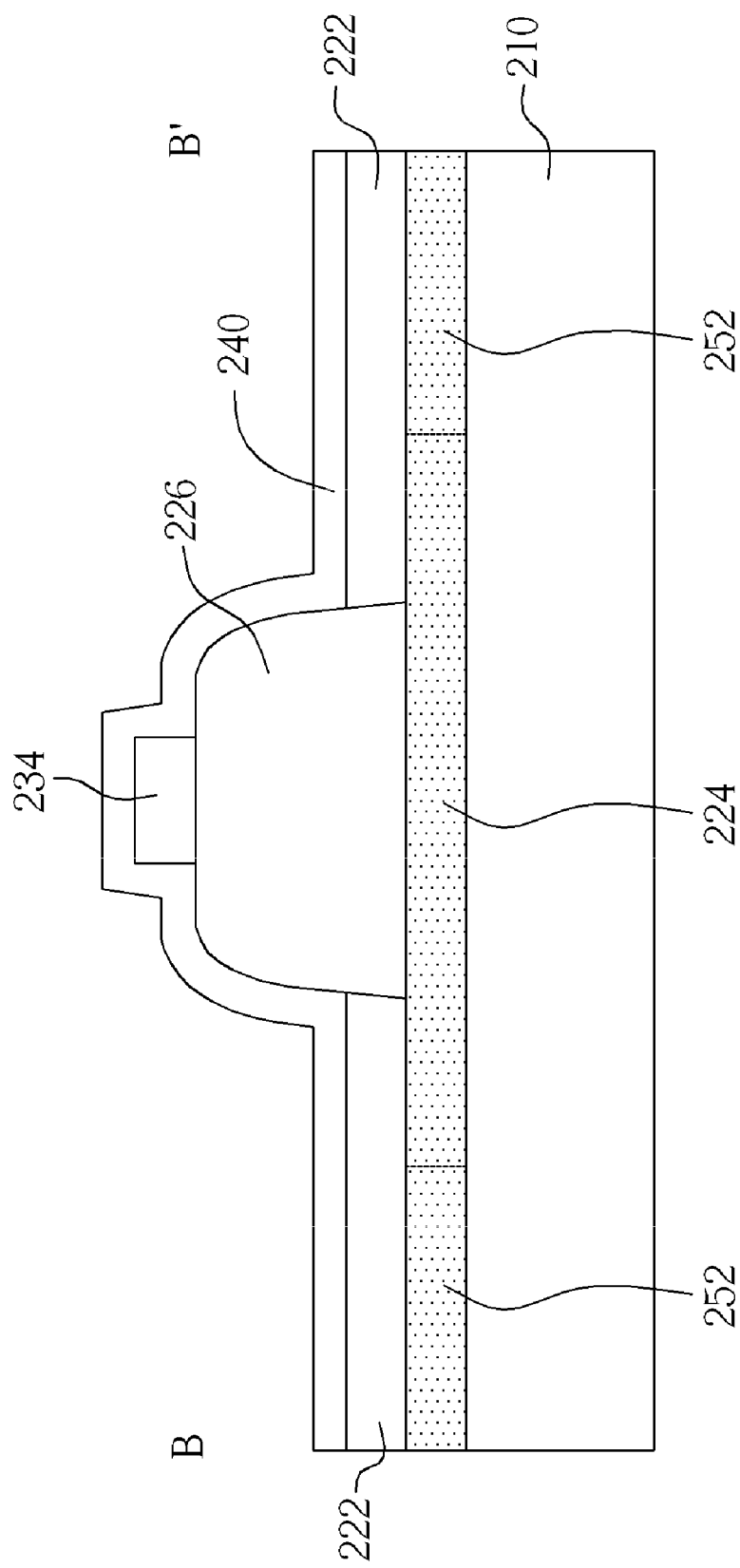
FIG. 4A is a cross-sectional view taken along abbreviated line B-B' of FIG. 3.
Figure 4B:
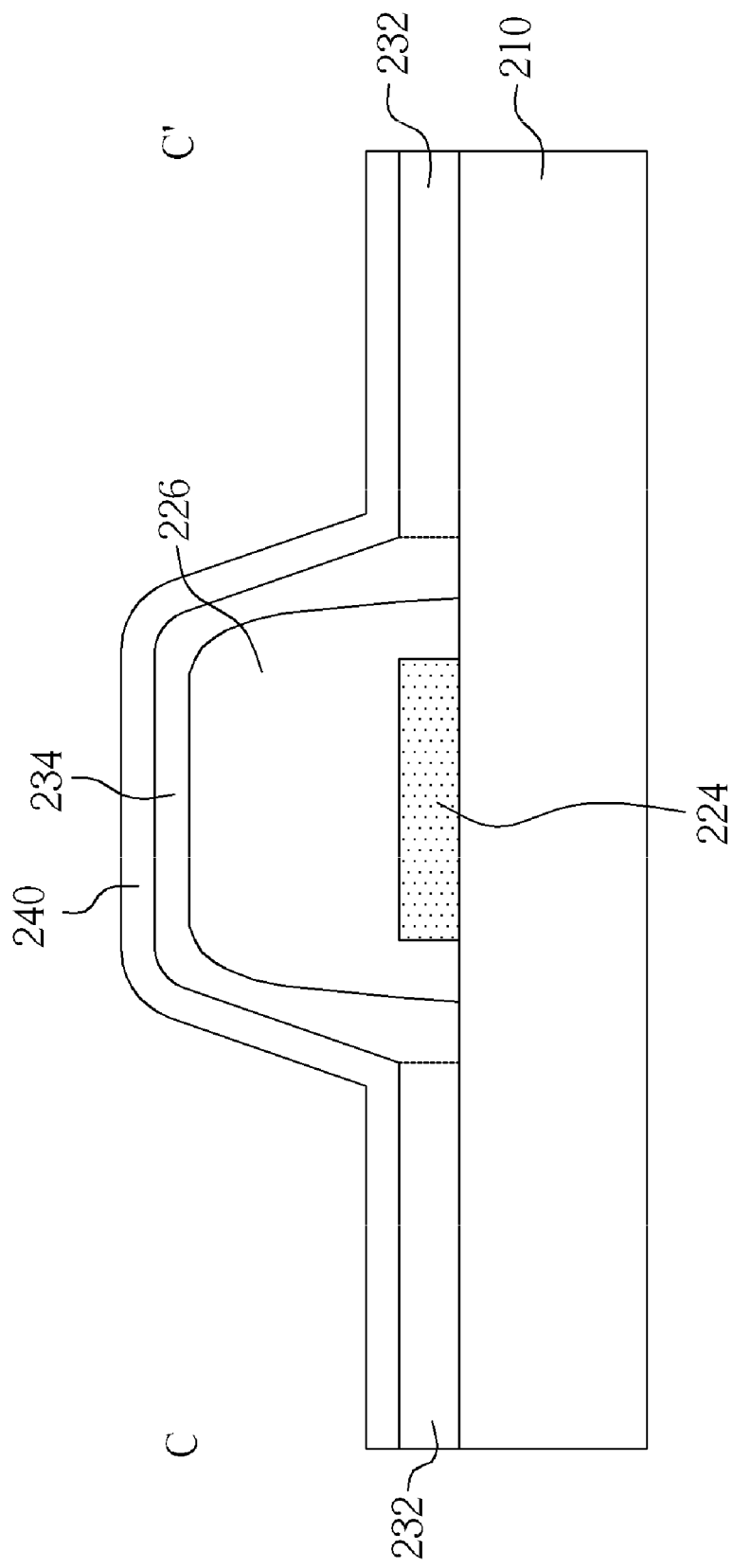
FIG. 4B is a cross-sectional view taken along abbreviated line C-C' of FIG. 3.
Figure 4C:
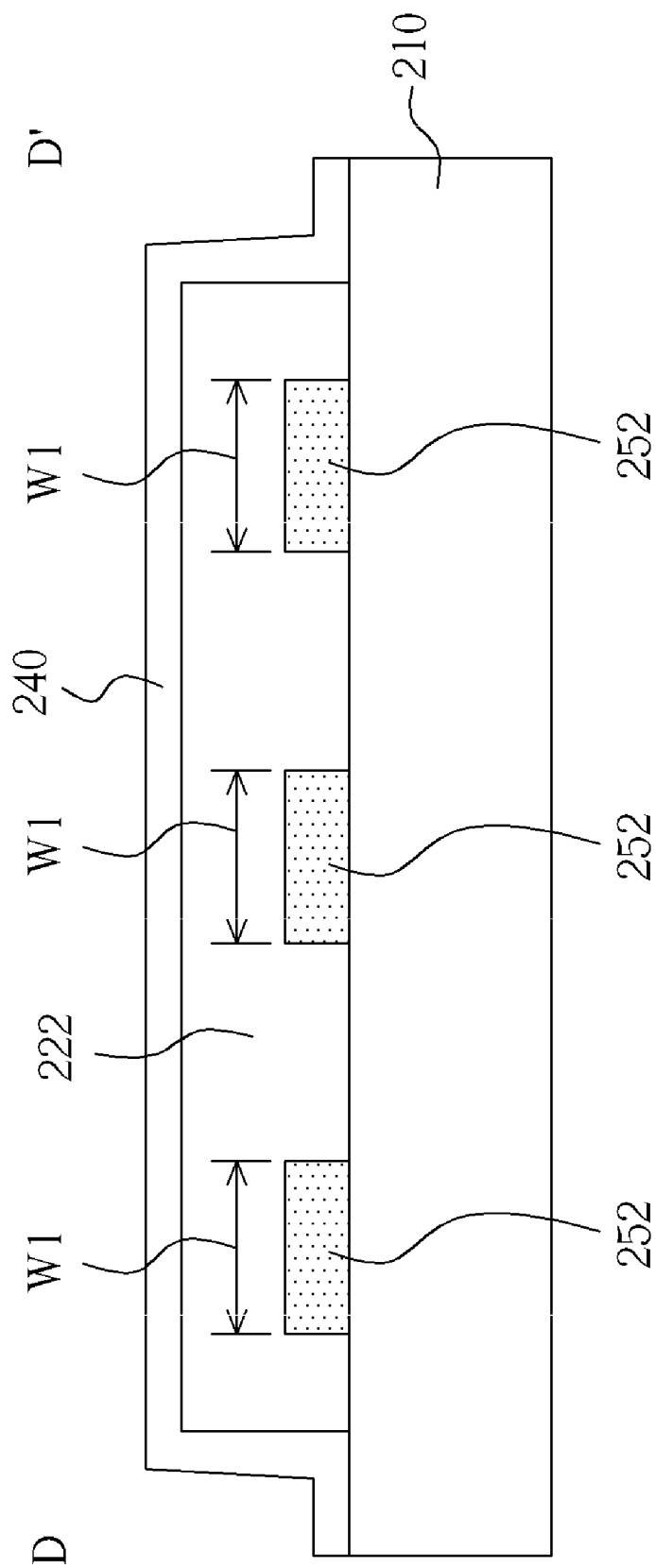
FIG. 4C is a cross-sectional view taken along abbreviated line D-D' of FIG. 3.

FIG. 2 is a schematic drawing of a touch panel and a display panel provided by the first embodiment of the present invention. FIG. 3 is a top plan view of a portion of the touch panel of FIG. 2. FIG. 4A is a cross-sectional view taken along abbreviated line B-B' of FIG. 3. FIG. 4B is a cross-sectional view taken along abbreviated line C-C' of FIG. 3. FIG. 4C is a cross-sectional view taken along abbreviated line D-D' of FIG. 3.

Please refer to both FIG. 2 and FIG. 3. A touch panel 202 is disposed on a display panel 204, and the display panel 204 is exemplarily a liquid crystal display (LCD) panel. The touch panel 202 comprises a substrate 210, a plurality of first sensing strings 220, a plurality of second sensing strings 230 and a plurality of first assistant lines 252. In this embodiment, the substrate 210 can be a firm or flexible substrate. For example, the firm substrate may include a glass substrate or silicon substrate, and the flexible substrate may include polyethylene terephthalate (PET), polyethylene naphthalate (PEN), polyester (PES), polymethylmethacrylate (PMMA), polycarbonate (PC), or polyimide (PI).

Please still refer to FIG. 3. The first sensing strings 220 are disposed on the substrate 210 and parallel to each other. Each of the first sensing strings 220 comprises a plurality of first sensing pads 222 and a plurality of first connecting lines 224. The embodiment is exemplarily detailed with one of the first sensing strings 220. The first connecting lines 224 are parallel to a first direction D1 and electrically connected to the first sensing pads 222 in series. To ensure the superior transmittance of the touch panel 202, the first sensing pads 222 can comprise a transparent conductive material such as ITO or IZO.

The second sensing strings 230 are disposed on the substrate 210 and parallel to each other. The second sensing strings 230 comprise a plurality of second sensing pads 232 and a plurality of second connecting lines 234. In each of the second sensing strings 230, the second connecting lines 234 are parallel to a second direction D2 and electrically connected to the second sensing pads 232 in series. In the same concept, the second sensing pads 232 can comprise the transparent conductive material as used in the first sensing pads 222.

The first assistant lines 252 are positioned within an area of the first sensing pads 222 and parallel to the first direction D1. In the embodiment, portions of the first assistant lines 252 are connected to the two adjacent first connecting lines 224. In other words, the portions of the first assistant lines 252 and the first connecting lines 224 form a continuous long conducting line.

As shown in FIG. 4A and FIG. 4B, the first sensing pads 222 and the second sensing pads 232 are coplanar. In other words, the first sensing pads 222 and second sensing pads 232 are exemplarily a same layer on the substrate 210. The first sensing pads 222 and the second sensing pads 232 can be formed on the substrate 210 simultaneously.

In the embodiment, the second connecting lines 234 bridge across the first connecting lines 224 while the first connecting lines 224 are electrically isolated from the second connecting lines 234. In more detail, the touch panel 202 exemplarily includes a plurality of dielectric patterns 226 positioned between the first connecting lines 224 and the second connecting lines 234 for electrically isolating the first connecting lines 224 from the second connecting lines 234.

Please refer to FIG. 4C. The first assistant lines 252 are formed directly in contact with the first sensing pads 222. The first connecting lines 224 and the first assistant lines 252 can be on a same layer. In other embodiments, the first connecting lines 224 and the first assistant lines 252 are formed simultaneously on the substrate 210 by patterning a conductive material layer. In addition, the second connecting lines 234, the first sensing pads 222 and the second sensing pads 232 are on a same layer.

The first assistant lines 252 comprise metal such as Al, Mo, Al/Mo multilayer, Al/Nd and Mo multilayer, or the combination thereof. It is noteworthy that the resistance of the first assistant lines 252 is lower than that of the first sensing pads 222 and the second sensing pads 232. Accordingly, an average resistance of the first sensing string 220 is reduced by the first assistant lines 252 which have lower resistance. In other words, by positioning the first assistant lines 252, the resistance of the first sensing string 220 is adjusted to improve the sensitivity of the touch panel 202.

Since the first assistant lines 252 having lower resistance comprise metal that is opaque, the line width W1 of the first assistant lines 252 is preferably limited to within a proper range for reducing its impact to the transmittance of the touch panel 202. Within the proper range of the line width W1, the transmittance of the touch panel 202 is impervious while the first assistant lines 252 obtain the lower resistance.

In the embodiment, the line width W1 of the first assistant lines 252 is exemplarily smaller than 30 μm, but not limited to this. Those skilled in the art would easily realize that the line width W1 of the first assistant lines 252 can be different as required for optimizing the transmittance and the resistance of the touch panel in other embodiments.

Furthermore, as shown in FIGS. 4A-4C, the touch panel 202 further comprises a protecting layer 240 positioned on the substrate 210, and covering the first sensing strings 220 and the second sensing strings 230. The protecting layer 240 exemplarily comprises silicon oxide, silicon nitride, silicon oxynitride or organic photoresist. The protecting layer 240 protects the touch panel 202 from external damage, water, or dirty from environment.

Figure 5:
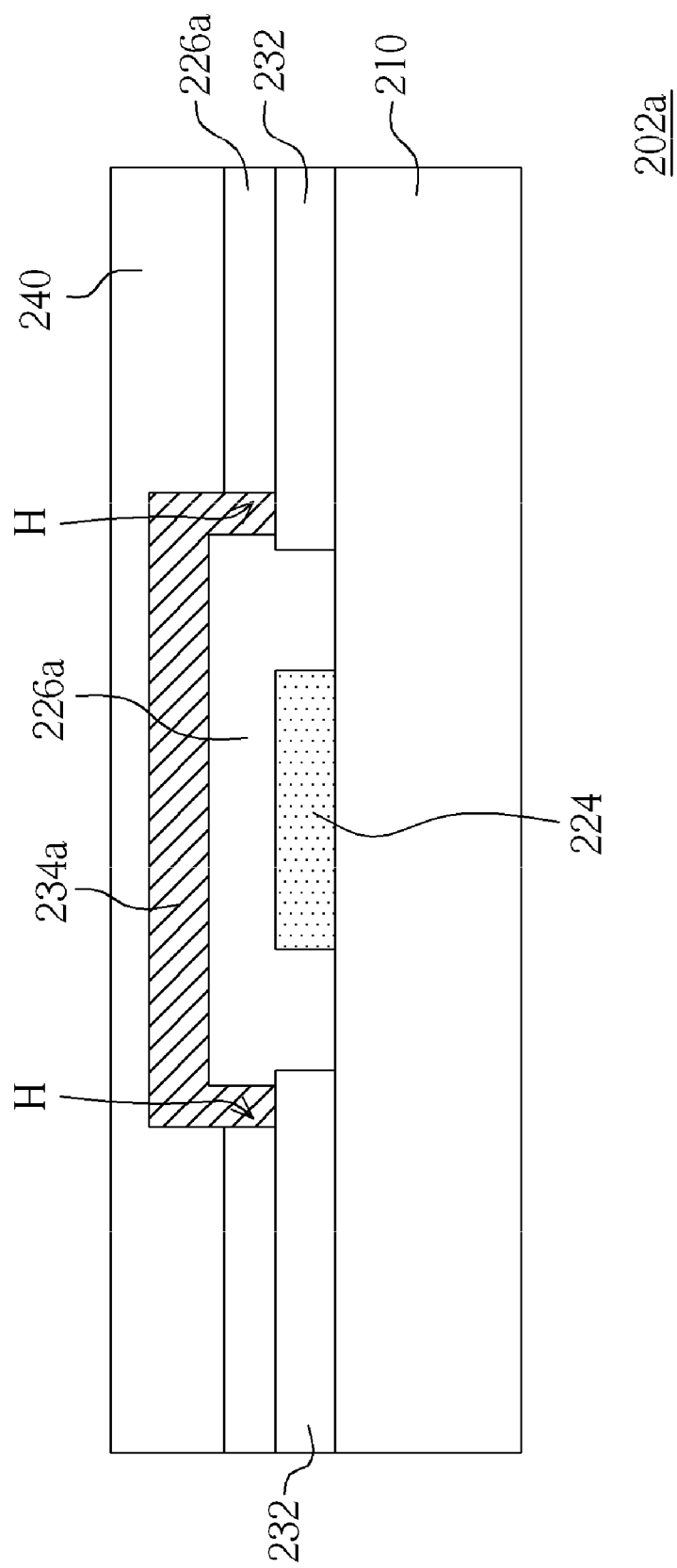
FIG. 5 is a cross-sectional view of a portion of a touch panel provided by an embodiment of the present invention with only some elements shown.

FIG. 5 is a cross-sectional view of a portion of a touch panel provided by an embodiment of the present invention with only some elements shown. Please note that the touch panel 202a comprises elements the same as the abovementioned touch panel 202, those elements are designated by the same numerals and the details are omitted hereinafter.

The difference between the touch panel 202a and the touch panel 202 is: the touch panel 202a comprises a dielectric layer 226a positioned in between the first connecting lines 224 and the second connecting lines 234a for isolating the first connecting lines 224 from the second connecting lines 234a. Functions of the second connecting lines 234a are substantially similar to that of the second connecting lines 234. The two adjacent second sensing pads 232 are connected by the second connecting line 234a through a plurality of contact vias H in the dielectric layer 226a. In other words, the first connecting lines 224 and the second connecting lines 234 can be electrically isolated from each other by various modifications.

The resistances of the touch panel 202, 202a along the first direction D1 are reduced by positioning the first assistant lines 252, and thus its sensitivity is improved. By limiting the line width W1 of the first assistant lines 252, 252a, the transmittance of the touch panel 202, 202a remains imperviously superior.

Second Embodiment

Figure 6A:
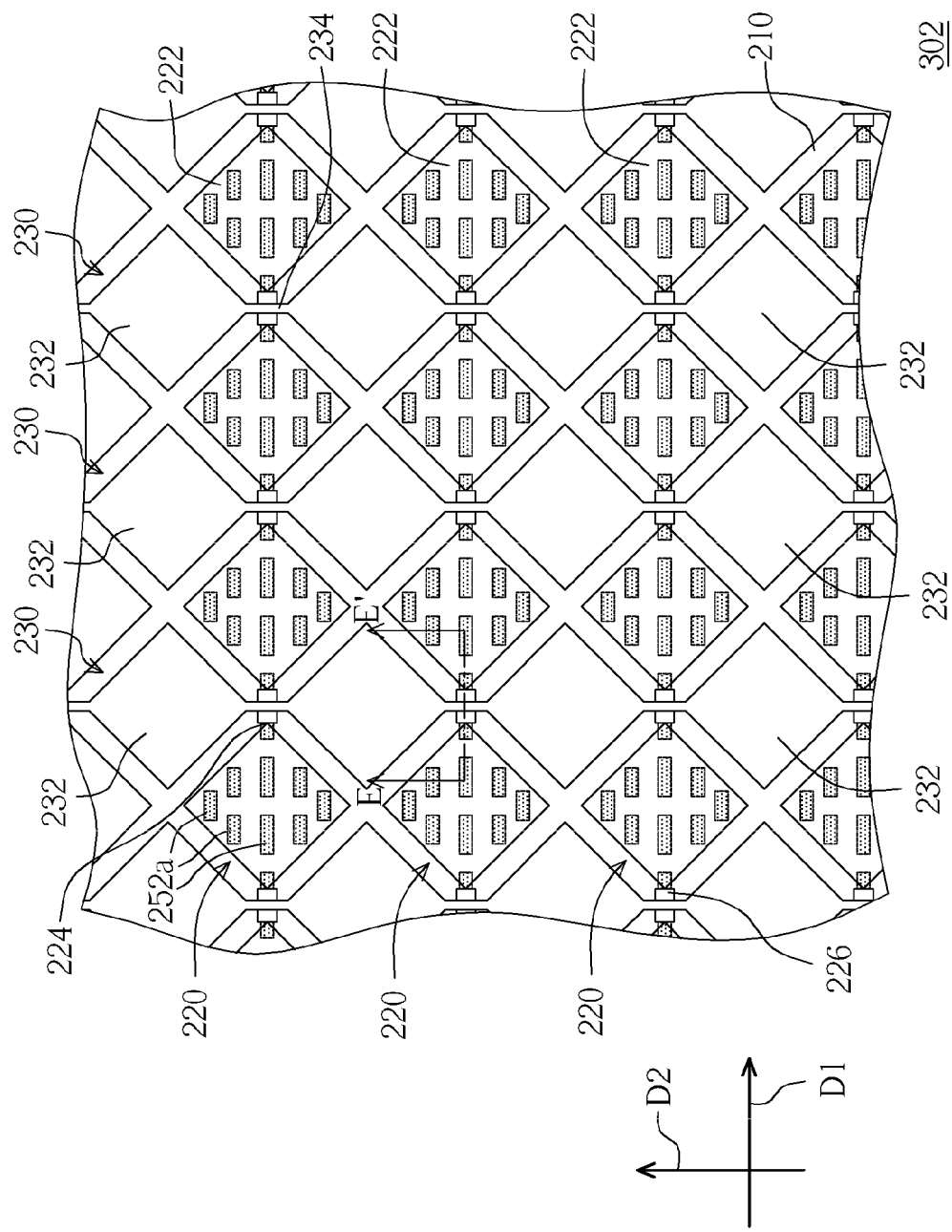
FIG. 6A is a top plan view of a portion of a touch panel provided by a second embodiment of the present invention.
Figure 6B:
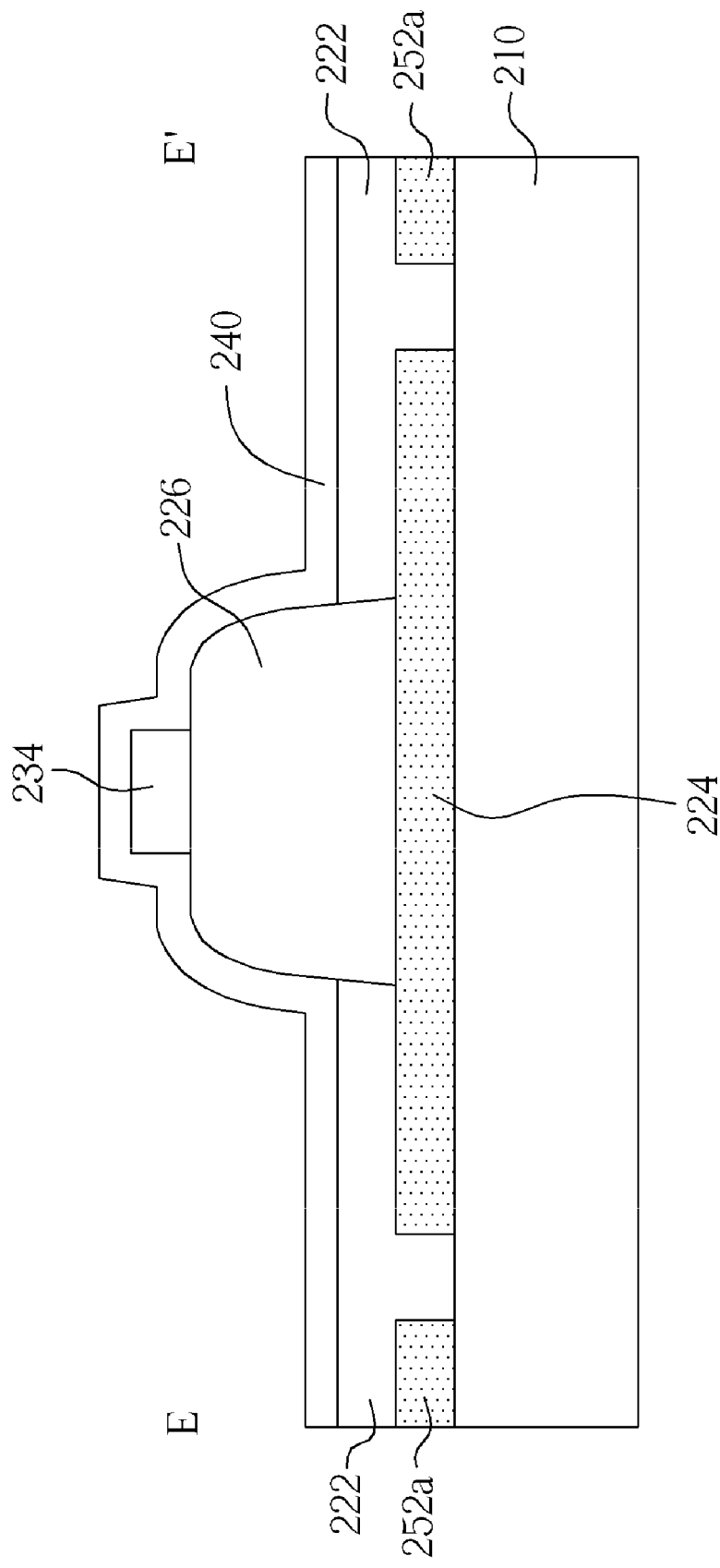
FIG. 6B is a cross-sectional view taken along abbreviated line E-E' of FIG. 6A.

FIG. 6A is a top plan view of a portion of a touch panel provided by the second embodiment of the present invention. FIG. 6B is a cross-sectional view taken along abbreviated line E-E' of FIG. 6A. Please refer to FIG. 6A and FIG. 6B. The touch panel 302 comprises elements the same as the abovementioned touch panel 202, those elements are designated by the same numerals and the details are omitted hereinafter.

Similarly, in the touch panel 302, the first assistant lines 252a are positioned within the area of the first sensing pads 222 and parallel to the first direction D1. The first assistant lines 252a directly contact the first sensing pads 222. The difference between the touch panel 302 and the touch panel 202 is: the first assistant lines 252a are not connected to the two adjacent first connecting lines 224. A layout of the first assistant lines 252a of the touch panel 302 is different from that of the touch panel 202. Specifically, a number of the first assistant lines 252a of the touch panel 302 is larger than that of the first assistant lines 252 of the touch panel 202 or the shape of the first assistant lines 252a of the touch panel 302 is different from that of the first assistant lines 252 of the touch panel 202.

It is well-known that modifications to the first assistant lines 252 can be made as required. It is noteworthy that the first assistant lines 252 parallel to the first direction D1 effectively improve signal transmission efficiency of the first sensing strings 220 along the first direction D1.

In the abovementioned touch panel 202, 302 provided by the first and the second embodiments, the first assistant lines 252 are positioned only in the first sensing strings 220. In other embodiments not shown, the assistant lines can be positioned only in the second sensing strings 230. However, it is not limited to position the assistant lines alternatively in the first sensing strings or the second sensing strings. In other embodiments, the assistant lines are positioned in both of the first sensing strings and the second sensing strings as following.

Third Embodiment

Figure 7:
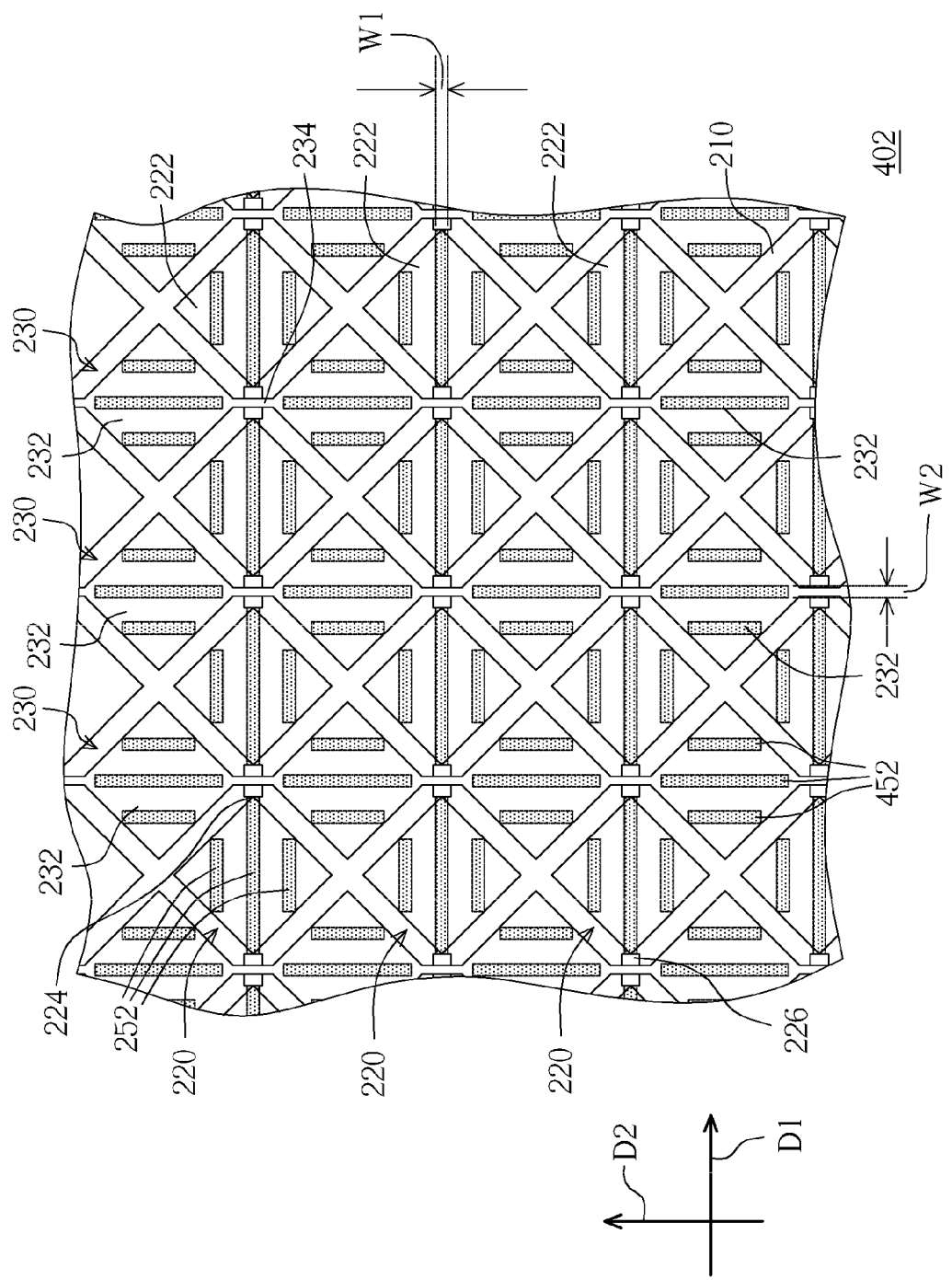
FIG. 7 is a top plan view of a portion of a touch panel provided by a third embodiment of the present invention.

FIG. 7 is a top plan view of a portion of a touch panel provided by the third embodiment of the present invention. Please refer to FIG. 7. The touch panel 402 comprises elements the same as the abovementioned touch panel 202, those elements are designated by the same numerals and the details are omitted hereinafter.

The difference between the touch panel 402 and the touch panel 202 is: the touch panel 402 further comprises a plurality of second assistant lines 452 positioned within an area of the second sensing pads 232 and parallel to the second direction D2. The second assistant lines 452 directly contact the second sensing pads 232. In the embodiment, the second assistant lines 452 and the first assistant lines 252 are on a same layer. The second assistant lines 452 and the first assistant lines 252 can be simultaneously formed on the substrate 210, exemplarily.

Similarly, to improve transmittance of the touch panel 402, a line width W2 of the second assistant lines 452 is preferably limited to within a proper range. In the third embodiment the line width W2 of the second assistant lines 452 is exemplarily smaller than 30 μm, but not limited to this. In other embodiments, the line width W2 of the second assistant lines 452 can be modified according to design requirements. In another embodiment not shown, portions of the second assistant lines 452 are connected to the two adjacent second connecting lines 234. In other words, the second assistant lines 452 and the second connecting lines 234 form a continuous long conducting line.

The touch panel 402 comprises the first assistant lines 252 and the second assistant lines 452, therefore the resistance of the touch panel 402 along the first direction D1 and the second direction D2 are both reduced, and the sensitivities of the touch panel 402 in different directions are improved.

According to the abovementioned embodiments, as long as the resistance of the touch panel is adjusted by positioning the assistant lines directly contacting the sensing pads, it is made without departing from the spirit and scope of the present invention.

Fourth Embodiment

Figure 8:
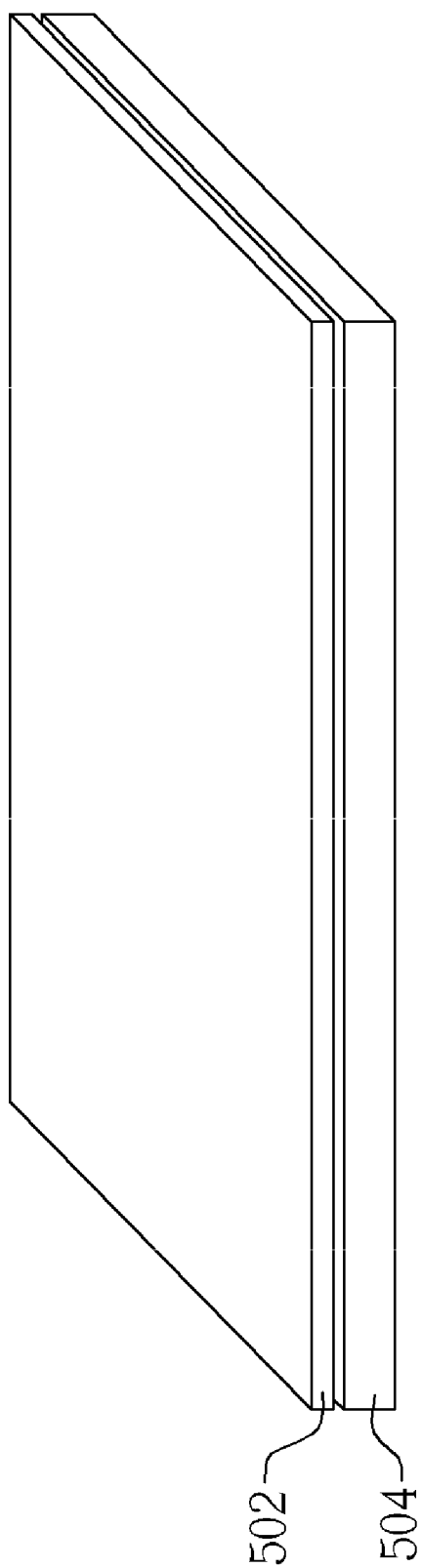
FIG. 8 is a schematic drawing of a touch panel and a display panel provided by a fourth embodiment of the present invention.
Figure 9A:
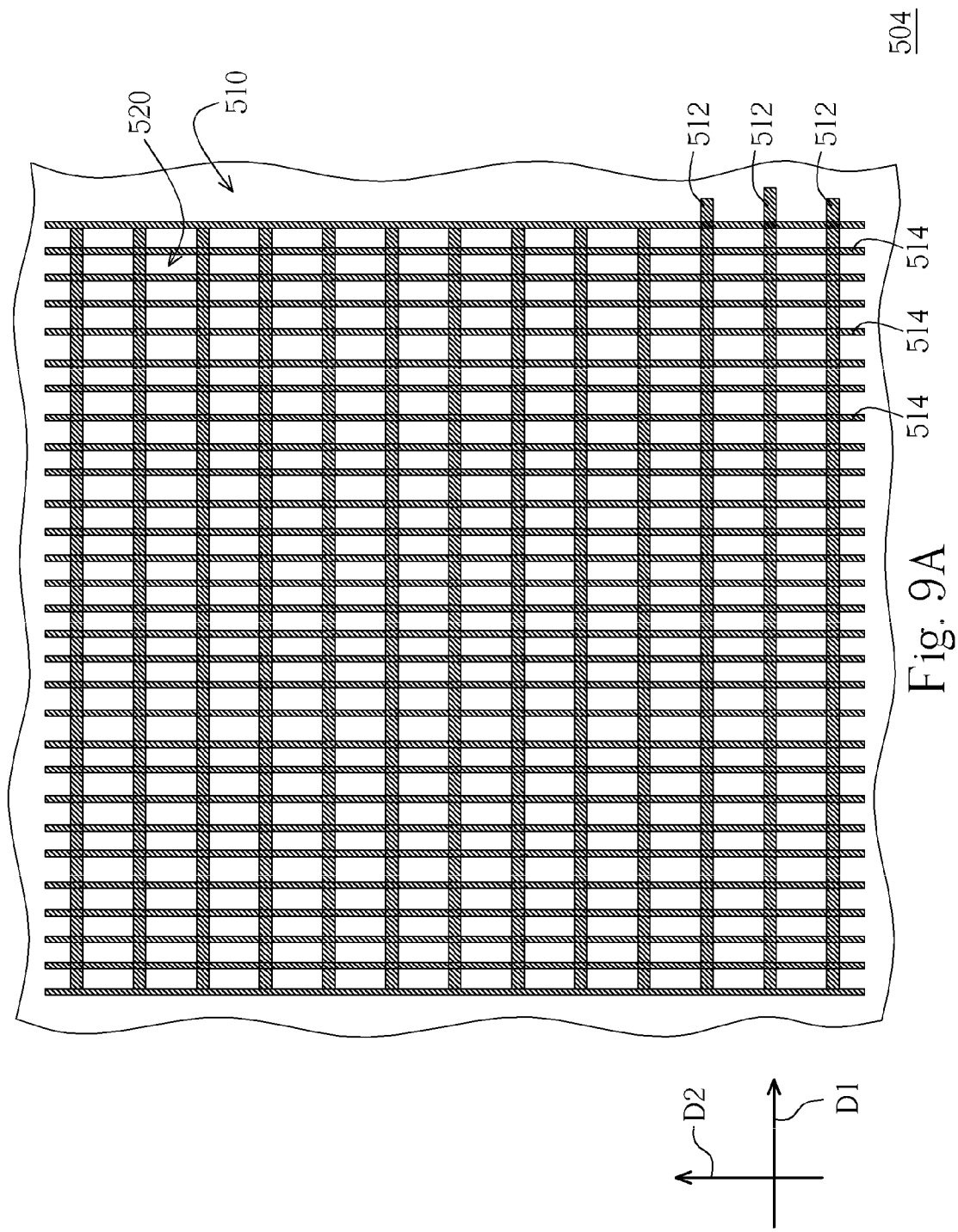
FIG. 9A is a top plan view of a portion of the display panel of FIG. 8.
Figure 9B:
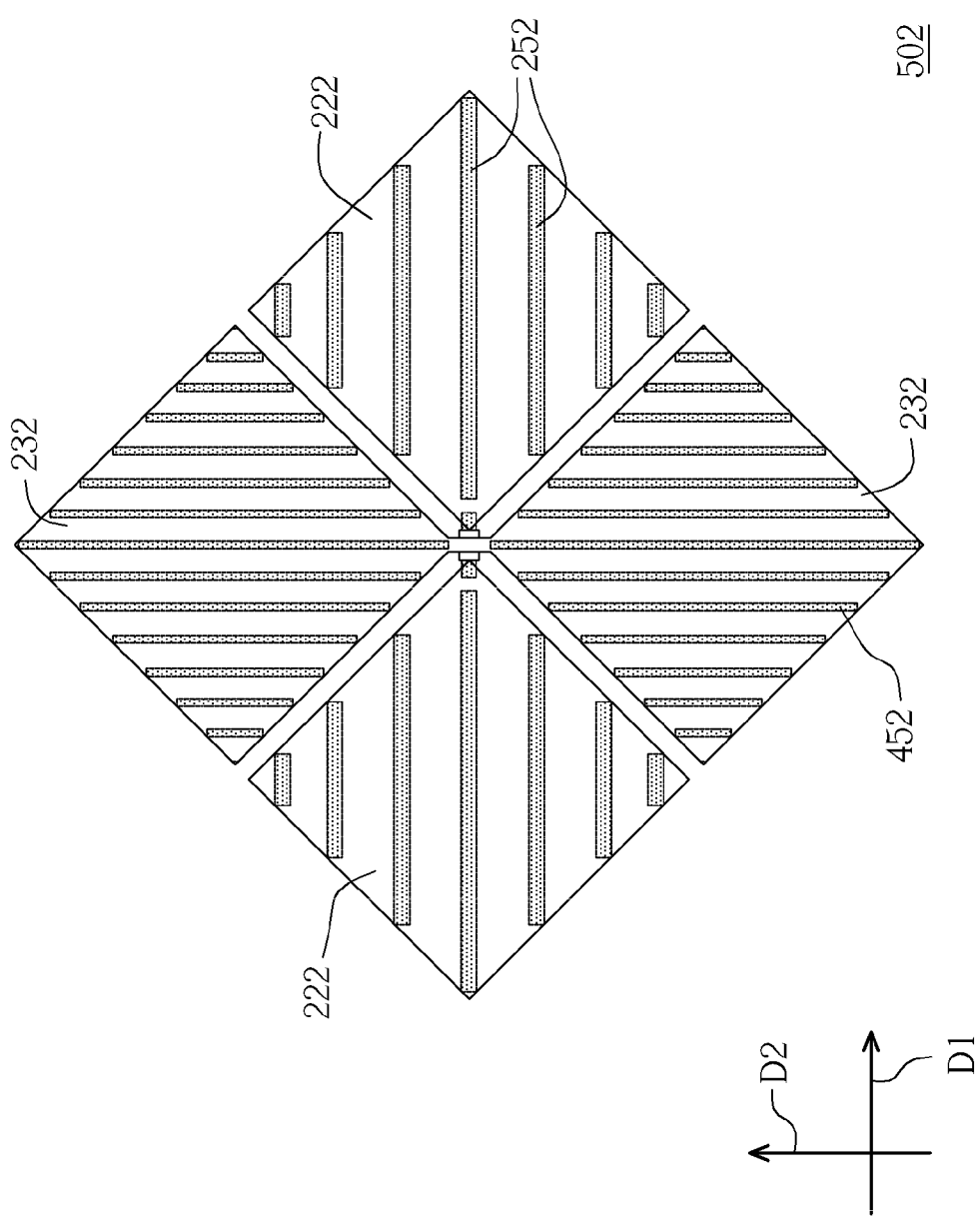
FIG. 9B is a top plan view of a portion of the touch panel of FIG. 8 where only the first sensing pads and the second sensing pads are shown.

FIG. 8 is a schematic drawing of a touch panel and a display panel provided by the fourth embodiment of the present invention. FIG. 9A is a top plan view of a portion of the display panel of FIG. 8. FIG. 9B is a top plan view of a portion of the touch panel of FIG. 8 with only the first sensing pads and the second sensing pads shown. And FIG. 9C is a top plan view of a portion of an assembly of the touch panel of FIG. 9A and the display panel of FIG. 9B.

Please refer to FIG. 8 and FIG. 9A. A touch panel 502 is disposed on a display panel 504. The display panel 504 comprises a black matrix pattern 510, and the black matrix pattern 510 includes a plurality of horizontal lines 512 parallel to the first direction D1 and a plurality of vertical lines 524 parallel to the second direction D2 for defining a plurality of pixel regions 520. The touch panel 502 is substantially similar with the touch panel 402 described in the third embodiment, thus the same elements are designated by the same numerals and the details are omitted hereinafter.

Figure 9C:
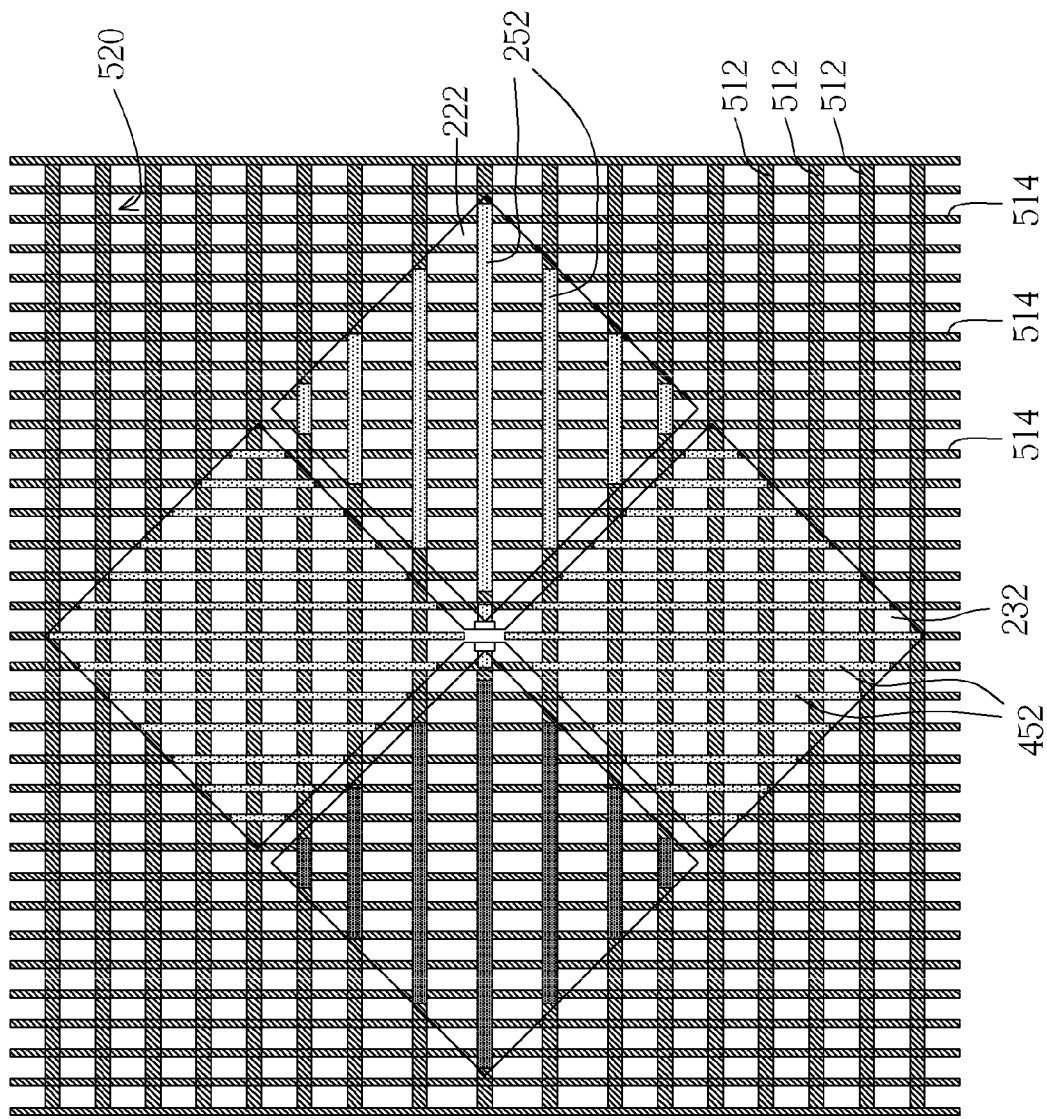
FIG. 9C is a top plan view of a portion of an assembly of the touch panel of FIG. 9A and the display panel of FIG. 9B.
Figure 9C:
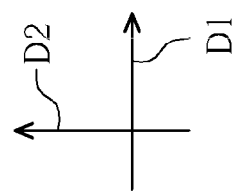

Please refer to FIG. 9B and FIG. 9C. In the fourth embodiment, when assembling the touch panel 502 and the display panel 504, the first assistant lines 252 of the touch panel 502 overlap the horizontal lines 512, and the second assistant lines 452 overlap the vertical lines 514. Since the black matrix pattern 510 of the display panel 504 is an opaque region, the first assistant lines 222 and the second assistant lines 452 of the touch panel 502 that are respectively positioned on the horizontal lines 512 and the vertical lines 514 of the black matrix pattern 510 do not affect the aperture ratio of the display panel 504. In other words, after assembling the touch panel 502 and the display panel 504, the touch panel 502 has improved resistance and superior transmittance while the display quality of the display panel 504 remains superior.

Figure 10A:
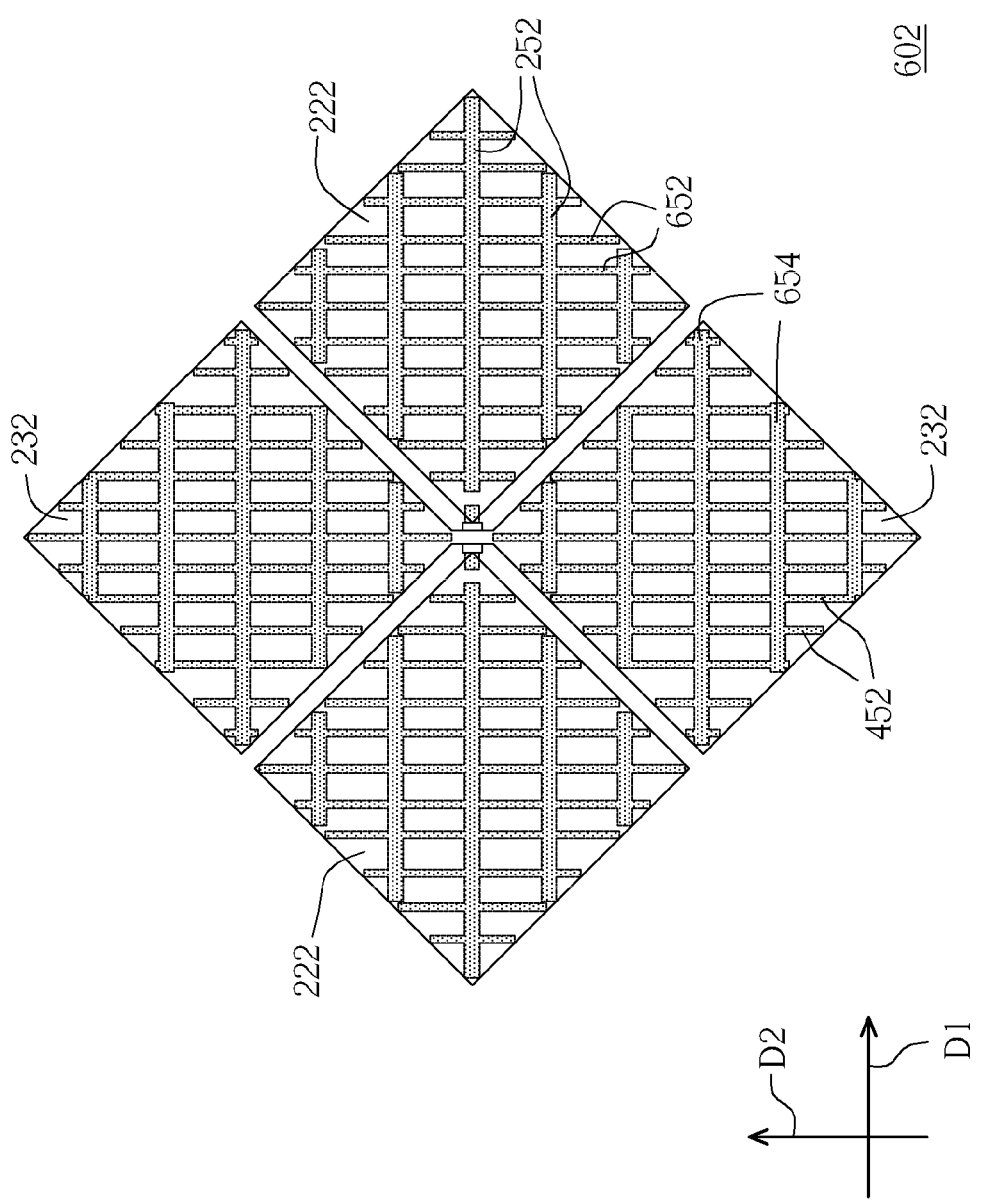
FIG. 10A is a top plan view of a portion of a touch panel provided by an embodiment of the present invention with only the first sensing pads and the second sensing pads shown.
Figure 10B:
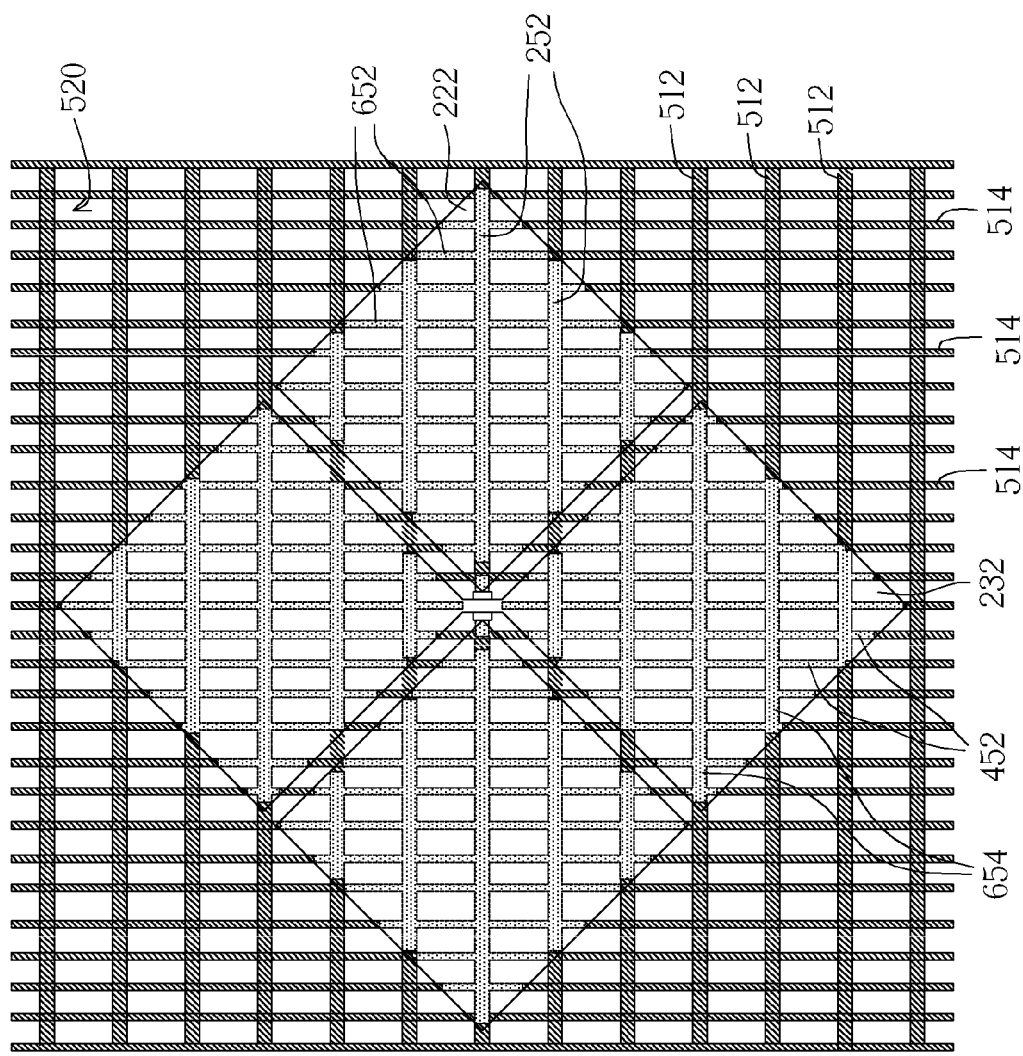
FIG. 10B is a top plan view of a portion of an assembly of the touch panel of FIG. 10A and the display panel of FIG. 9B.

FIG. 10A is a top plan view of a portion of a touch panel provided by an embodiment of the present invention with only the first sensing pads and the second sensing pads shown. FIG. 10B is a top plan view of a portion of an assembly of the touch panel of FIG. 10A and the display panel of FIG. 9B. In another embodiment, the touch panel 502 can be replaced with the touch panel 602 of FIG. 10A. The same elements are designated by the same numerals and the details are omitted hereinafter.

Please refer to FIG. 10A and FIG. 10B. The difference between the touch panel 602 and the touch panel 502 is: the touch panel 602 further comprises a plurality of third assistant lines 652 and a plurality of fourth assistant lines 654. The third assistant lines 652 are positioned within the area of the first sensing pads 222 and directly contact the first sensing pads 222. The third assistant lines 652 overlap the vertical lines 514. The fourth assistant lines 654 are positioned within the area of the second sensing pads 232 and directly contact the second sensing pads 232. The fourth assistant lines 654 overlap the horizontal lines 512. In other words, the third assistant lines 652 are the lines parallel to the second direction D2 in the first sensing pads 222. Similarly, the fourth assistant lines 654 are the lines parallel to the first direction D1 in the second sensing pads 232.

Since the touch panel 602 comprises the third assistant lines 652 and the fourth assistant lines 654, the resistances of each sensing pads (including the first sensing pads 222 and the second sensing pads 232) are improved along both the first direction D1 and the second direction D2. Furthermore, since the third assistant lines 652 and the fourth assistant lines 654 are also positioned on the black matrix pattern 510, the touch panel 602 has improved resistance and transmittance.

Accordingly, because the first assistant lines and the second assistant lines are positioned on the touch panel of present invention, the whole resistance is reduced. Thus sensitivity of the touch panel of the present invention is improved. In some embodiments, the first assistance lines and the second assistant lines are positioned corresponding to the black matrix pattern of the display panel, thus the touch panel of the present invention further improves aperture ratio and display quality of the display panel. In addition, in some embodiments, the touch panel of the present invention further comprises the third assistant lines and the fourth assistant lines, thus the resistance of the sensing strings of the touch panel are further improved along each direction.

Those skilled in the art will readily observe that numerous modifications and alterations of the device and method may be made while retaining the teachings of the invention.

What is claimed is:

1. A touch panel disposed on a display panel comprising:
   a substrate;
   a plurality of first sensing strings parallel to each other and disposed on the substrate;
   a plurality of second sensing strings parallel to each other and disposed on the substrate; wherein the first sensing strings and the second sensing strings comprise a plurality of sensing pads, a plurality of first connecting lines and a plurality of second connecting lines, the first connecting lines being parallel to a first direction and electrically connected to portions of the sensing pads in series to construct the first sensing strings, the second connecting lines being parallel to a second direction and electrically connected to another portions of the sensing pads in series to construct the second sensing strings, the sensing pads are coplanar, and the first connecting lines are electrically isolated from the second connecting lines; and
   a plurality of assistant lines positioned in an area of the sensing pads, the assistant lines directly contacting with the sensing pads.

2. The touch panel of claim 1, wherein a line width of each one of the assistant lines is smaller than 30 μm.

3. The touch panel of claim 1, wherein the assistant lines are alternatively positioned in the first sensing strings or in the second sensing strings.

4. The touch panel of claim 1, wherein the assistant lines are positioned in both of the first sensing strings and the second sensing strings.

5. The touch panel of claim 1, wherein portions of the assistant lines are connected to the two adjacent first connecting lines.

6. The touch panel of claim 1, wherein the first connecting lines and the assistant lines are formed by same layer, and the second connecting lines and he sensing pads are formed by same layer.

7. The touch panel of claim 1 further comprising a dielectric layer positioned in between the first connecting lines and the second connecting lines for electrically isolating the first connecting lines from the second connecting lines.

8. The touch panel of claim 1 further comprising a protecting layer positioned on the substrate and covering the first sensing strings and the second sensing strings.

9. The touch panel of claim 1, wherein the display panel further comprises a black matrix pattern having a plurality of horizontal lines parallel to the first direction and a plurality of vertical lines parallel to the second direction to define a plurality of pixel region, and the assistant lines are overlapped to the black matrix pattern.

10. The touch panel of claim 1, wherein the sensing pads comprise a transparent conductive material.

11. The touch panel of claim 10, wherein the transparent conductive material comprises indium tin oxide or indium zinc oxide.

12. The touch panel of claim 1, wherein the assistant lines comprise metal.

13. The touch panel of claim 1, wherein the assistant lines comprise aluminum (Al), molybdenum (Mo), Al/Mo multilayer, Al/neodymium (ND) and Mo multilayer, or the combination thereof.

* * * * *